Sept. 25, 1923.  
J. C. HALDEMAN  
RADIUS ROD  
Filed June 15, 1922  
1,469,179  
2 Sheets-Sheet 1

WITNESSES

INVENTOR  
J. C. Haldeman,  
BY  
ATTORNEYS

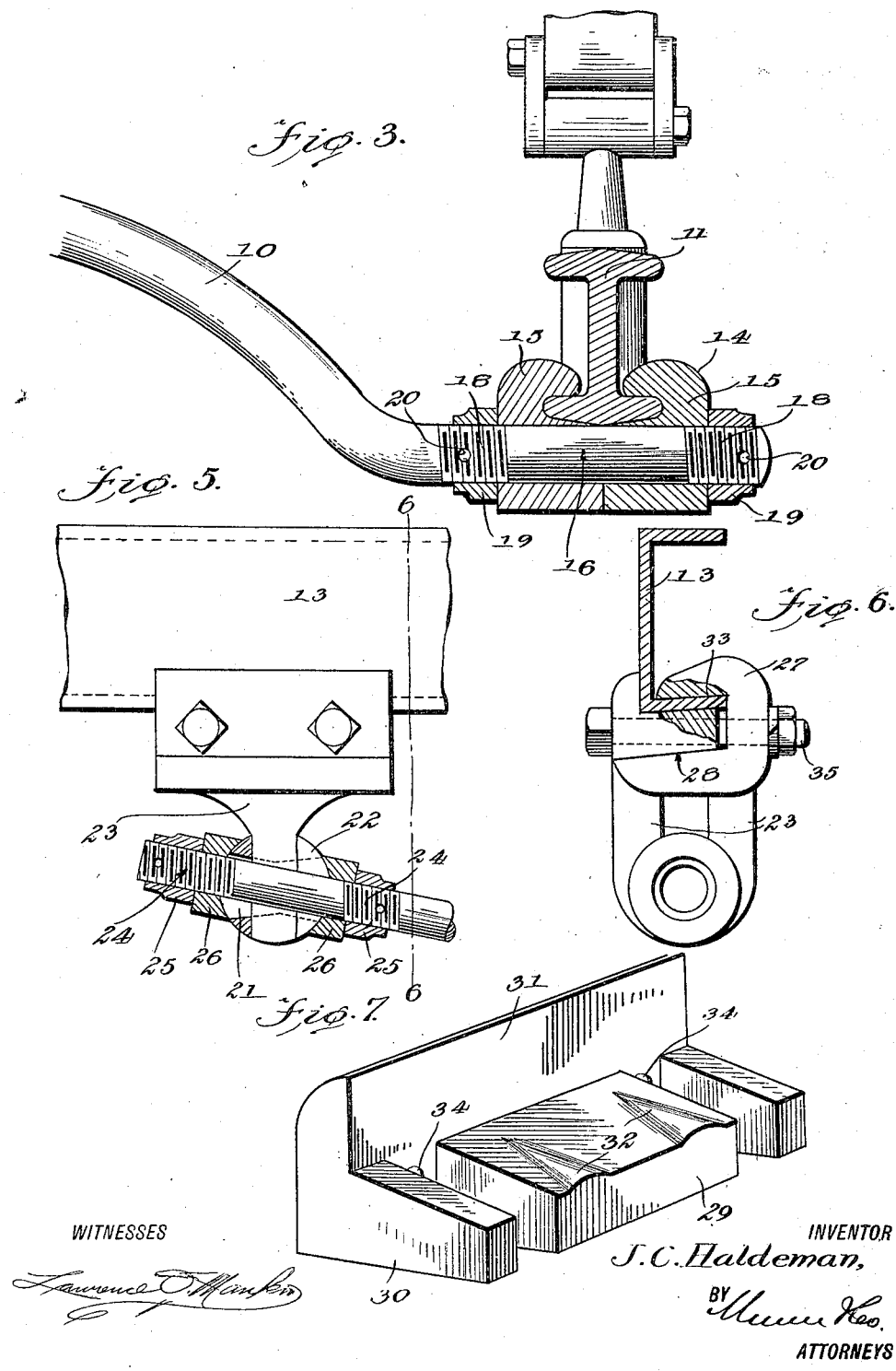

Patented Sept. 25, 1923.

1,469,179

UNITED STATES PATENT OFFICE.

JAMES CLYDE HALDEMAN, OF SALEM, OHIO.

RADIUS ROD.

Application filed June 15, 1922. Serial No. 568,611.

*To all whom it may concern:*

Be it known that I, JAMES CLYDE HALDEMAN, a citizen of the United States, and a resident of Salem, in the county of Columbiana and State of Ohio, have invented certain new and useful Improvements in Radius Rods, of which the following is a specification.

My present invention relates generally to radius rods, and more particularly to separate rods of this nature having independent bearing at their rear or inner ends upon the side frame members of a well known type of motor vehicle ordinarily employing rods converging at their rear ends and having a joint bearing between the longitudinal frame members.

The primary object of my invention is the provision of radius rods which may be readily utilized either in lieu of or in addition to the usual radius rods with a view of forming more substantial support and less noisy action, and a further object is the provision of a radius rod having means whereby its end connections may be easily and quickly adjusted at all times to avoid rattling and other noises.

Figure 1:
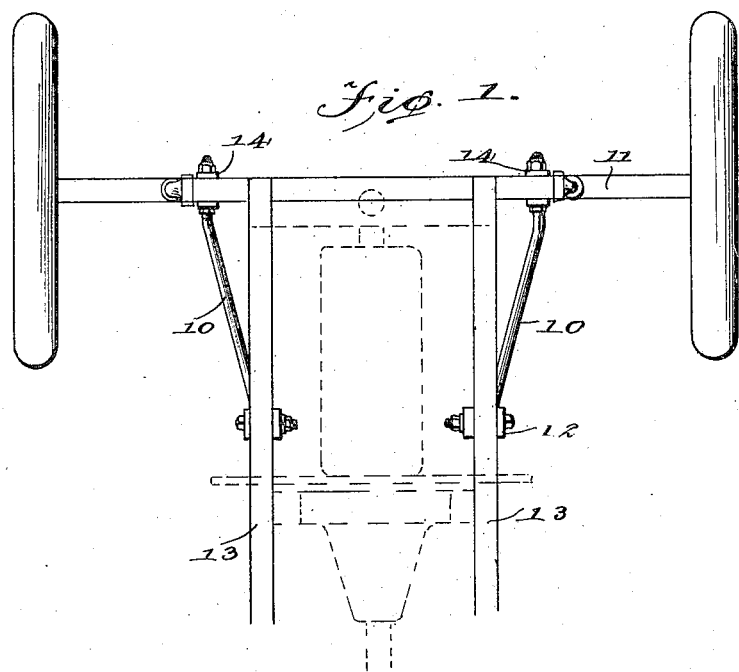
Figure 2:
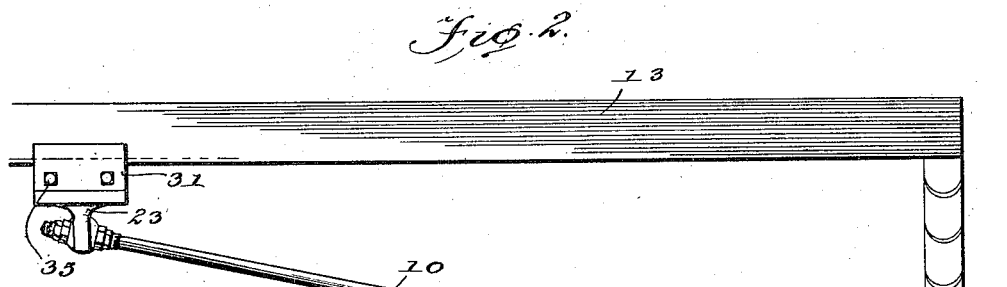
Figure 4:
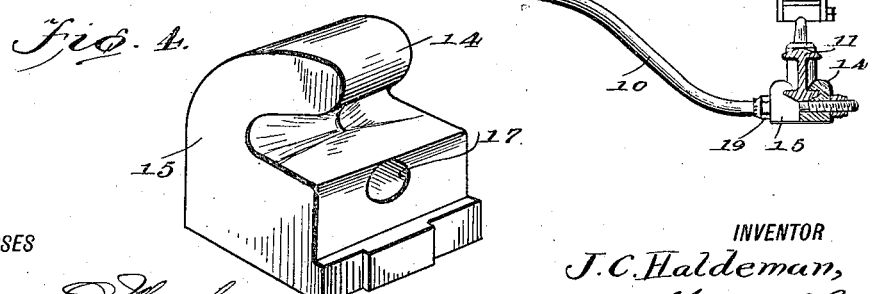

In the accompanying drawings which illustrate my present invention and form a part of this specification, Figure 1 is a partial top plan view of a vehicle chassis showing the practical application of my invention, Figure 2 is a partial side view thereof, portions being broken away and in section, Figure 3 is an enlarged sectional side elevation of the forward portion of the radius rod in the position as in use, Figure 4 is a detail perspective view of one of the front clamping members, Figure 5 is a detail side view partly in section of one of the rear connections, Figure 6 is a cross section taken on line 6—6 of Figure 5 with the rod removed, and Figure 7 is a detail perspective view of the wedge member constituting a part of the rear clamp.

Referring now to these figures and particularly to Figure 1 my invention proposes a radius rod 10 for use at each side of the forward portion of the chassis of a vehicle, each radius rod being securely clamped in non-displaceable relation to the front axle 11 as seen in Figure 1 and having at its rear end a universally movable connection with a rear clamp 12 non-displaceably engaged with the adjacent longitudinal frame bar or member 13 of the vehicle chassis at a point rearwardly beyond the front axle. For the above purposes each reach rod 10 is generally inclined upwardly and rearwardly in its operative position as best seen in Figure 2 and has a compound curve adjacent to its forward end, that is upwardly and inwardly permitting the forward clamp 14 to be engaged with the axle 11 as seen in Figure 1 at a point laterally beyond the vertical plane of its respective longitudinal frame member 13.

The forward end of the reach rod 10 as proposed by my invention receives a pair of opposed axle gripping clamps 15, loosely disposed on the forward straight extension of the reach rod indicated at 16, so that they can readily turn to evenly grip opposite sides of the lower flanges of the axle 11, it being preferable in practice that the inner axle engaging undercut faces of the clamping members 15 be slightly beveled toward opposite sides thereof in order that the central portions thereof will thus present ridges capable of biting into the material of the axle 11 to a sufficient extent to effectively avoid displacement of the forward clamp lengthwise of the axle.

To hold the clamping members and to force the latter into active position, the forward straight extension 16, which passes beneath the axle 11 as particularly seen in Figures 2 and 3 and extends through the bore 17 of each of the gripping members 15, is provided with spaced threaded portions 18, receiving nuts 19 abutting the outer faces of the clamps, which may be locked by means of cotter pins through transverse openings 20.

At its upper rear end, which is also straight, each radius rod passes through the oppositely flaring bore 21 of the rounded lower enlargement 22 of a supporting bracket 23, and is provided with threaded portions 24 at opposite sides of this bracket to receive nuts 25, the latter abutting concave washers 26 disposed against diametrically opposite sides of the ball-like enlargement 22 so that a universally movable connection is thus formed which through ready adjustment of the parts may be easily maintained and held against rattling and disturbing noises.

In order that bracket 23 may be easily, quickly and effectively connected to one of the side channel bars or members 13 of the vehicle frame, the upper portion of the bracket 23 has a slotted engaging head 27, at the lower portion of which slot is an upwardly facing inclined wedge receiving surface 28, the latter adapted to receive a wedging clamp 29 whose lower inclined surface 30 coacts with the surface 28 of the bracket. This wedging clamp extends as best seen in Figure 6 in practice upwardly against the lower surface of the lower flange of the channel bar in connection with which it is mounted so that this lower flange will thus be gripped between the wedge 29 and the upper head of the bracket which overlies the same. The wedge member 29 also has an upright flange 31 adapted to abut the outer side of the channel bar 13, and the upper surface of the wedge is preferably provided with upstanding ribs 32 which operate to force portions of the lower flange of the channel bar upwardly into conformable recesses 33 of the engaging head 27 of bracket 23 as clearly shown in Figure 6 so as to thus secure the rear clamp against accidental displacement lengthwise of the channel bar 13.

The engaging head of the bracket 23 has openings opposite openings 34 of the wedging clamp 29 and through these openings clamping bolts 35 are extended, tightening of which pulls the wedging clamp into the head of the bracket and into snug engagement with the channel bar to complete and maintain the clamped connection.

It is quite obvious from the foregoing that my invention proposes a radius rod capable of ready quick installation, effective efficient operation and which is of great strength and durability and may be used either in conjunction with the ordinary radius rods or in place thereof.

I claim:

1. A radius rod having axle gripping means at its forward end, a bracket movably supporting the rear end of said radius rod and having an upper engaging head and a wedge receiving slot below the head, a wedge adjustable in the slot and cooperating with the head to grip a vehicle frame member and means to adjust and hold the wedge in effective position.

2. A radius rod having axle gripping means at its forward end, a bracket movably supporting the rear end of said radius rod and having an upper engaging head and a wedge receiving slot below the head, a wedge adjustable in the slot and cooperating with the head to grip a vehicle frame member, said wedge and said engaging head having cooperating ribs and grooves adapted to upset portions of a frame bar engaged thereby and means to adjust and hold the wedge in effective position.

3. A radius rod having axle gripping means at its forward end, a bracket with which the rear end of the bar has a universally movable connection, said bracket having an upper engaging head and a wedge receiving slot below the head, a wedge shiftable in said slot in opposing cooperating relation to the head, and a clamping bolt extending through the wedge and through a portion of the bracket to adjust and hold the wedge in the said slot.

JAMES CLYDE HALDEMAN.